2,870,153
Patented Jan. 20, 1959

2,870,153

QUATERNARIES OF PYRIDYL AND QUINOLYL PROPIONITRILES

Samuel Allen Heininger, Dayton, Ohio, assignor to Monsanto Chemical Company, St. Louis, Mo., a corporation of Delaware No Drawing. Application June 12, 1956
Serial No. 590,816

12 Claims. (Cl. 260—286)

This invention relates to quaternary salts of aromatic N-heterocyclic tertiary amines wherein the fourth valence of the amino nitrogen atom is bonded to a 2-cyanoethyl radical; and to the preparation thereof.

The presently provided compounds are of the formula

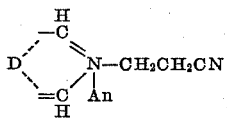

where An is the anion of a strong organic or inorganic acid, and D is the residue of an aromatic N-heterocyclic tertiary amine free of non-benzenoid unsaturation and contains only hydrogen, nitrogen, and from 2 to 12 carbon atoms.

By non-benzenoid unsaturation is here meant carbon to carbon, olefinic or acetylenic unsaturation. By an aromatic N-heterocyclic tertiary amine is here meant a monocyclic or fused polycyclic ring system containing a conjugated system of double bonds, wherein the ring skeleton consists of carbon atoms and at least one tertiary nitrogen atom.

The present quaternary salts are readily prepared by the reaction of an aromatic N-heterocyclic tertiary amine with a beta-substituted propionitrile derivative of the formula An—CH$_2$CH$_2$CN, as represented by the following equation:

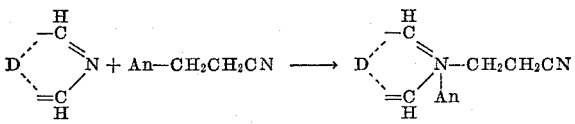

where D and An are as defined hereinabove. The anion An in the above formula may be a halogen such as chlorine, bromine or iodine, a sulfonate radical such as CH$_3$SO$_3$⁻, C$_2$H$_5$SO$_3$⁻, or p-CH$_3$C$_6$H$_4$SO$_3$⁻, an alkyl sulfate radical such as CH$_3$SO$_4$⁻, or a thiocyanate radical, etc. The propionitrile derivatives of the formula An—CH$_2$CH$_2$CN, carrying anions of the above-listed types linked to the beta carbon atom, are readily prepared, e. g., by addition of a hydrohalide across the double bond of acrylonitrile; by displacement of the chlorine atom of 3-chloropropionitrile with a thiocyano radical via a metathetical reaction, etc. Illustrative of beta-substituted propionitriles which may be utilized in the present reaction are 3-chloropropionitrile, 3-bromopropionitrile, 3-thiocyanopropionitrile, 3-(p-toluenesulfonyl) propionitrile, 3-(methanesulfonyl)propionitrile, 2-cyanoethyl methyl sulfate, 2-cyanoethyl ethyl sulfate, etc.

In accordance with the present invention, beta-substituted propionitriles are reacted with aromatic N-heterocyclic tertiary amines to produce quaternary salts. The aromatic N-heterocyclic tertiary amines which are presently useful contain only hydrogen, nitrogen, and from 4 to 14 carbon atoms, and include mono- and polycyclic ring systems, unsubstituted or substituted by alkyl radicals, wherein the tertiary N atom of the heterocyclic ring sysem is free of steric hindrance.

My copending application Serial No. 576,796, filed April 9, 1956, discloses the quaternization of aromatic N-heterocyclic tertiary amines with beta-substituted propionic acid esters. As disclosed therein, the beta-substituted propionates form quaternary salts with a variety of such amines, including, e. g., quinoline. I have now made the discovery that the beta-substituted propionitriles, on reaction with a tertiary heterocyclic amine wherein the N atom is sterically hindered, form an amine salt and acrylonitrile, rather than the expected quaternary salt. Thus, e. g., 3-chloropropionitrile is dehydrohalogenated by quinoline, to yield quinoline hydrochloride and acrylonitrile. On the other hand, the desired quaternary salt is obtained readily from 3-chloropropionitrile and isoquinoline, wherein the heterocyclic N atom is flanked by

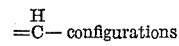

rather than by C atoms not bonded to H atoms.

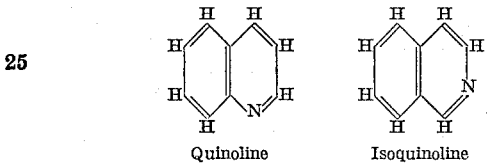

Other sterically hindered heterocyclic tertiary amines which have been found to cause formation of the olefinic nitrile, rather than a quaternary salt, include 2-picoline, quinaldine, and acridine; apparently both carbon atoms next to the N atom in the heterocyclic ring system must each be bonded to one hydrogen atom in order for quaternary salt formation to occur. Accordingly, the amines useful in preparing the quaternary salts of the invention are those heterocyclic tertiary amines which are free of steric hindrance and contain the

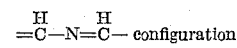

As examples of presently useful monocyclic tertiary amines containing one heterocyclic nitrogen atom and free of steric hindrance may be listed, for example, pyridine and the β- and γ-methylpyridines available, for example, from coal tar, i. e., 3-picoline, 4-picoline, 3,4- and 3,5-lutidine, 3,4,5-trimethylpyridine, and mixtures thereof, as well as 4-ethylpyridine, 3-isopropylpyridine, 3,4,5-tripropylpyridine, 4-n-hexylpyridine, etc. Bicyclic aromatic tertiary amine N-heterocyclic compounds which may be quaternized in accordance with the process of the invention includes isoquinoline and substituted isoquinolines free of steric hindrance such as 4-methylisoquinoline, 6-propylisoquinoline, etc. Typical of the tricyclic aromatic N-heterocyclic tertiary amines falling within the above-defined class of amines which are within the scope of the present reaction is benz[g]isoquinoline.

Among the heterocyclic tertiary amine compounds containing a plurality of nitrogen atoms which may be used in the present process for the production of the novel compounds of this invention may be listed the monocyclic N-heterocyclics such as pyrimidine and pyrazine, and polycyclic N-heterocyclics such as quinazoline.

The products of the present reaction are quaternary salts, the nomenclature of which is governed by the amine from which the salts are prepared. For example, from pyridine and beta-substituted propionitriles there may be prepared 1-(2-cyanoethyl)pyridinium chloride, 1-(2-cyanoethyl)pyridinium bromide, 1-(2-cyanoethyl)pyridinium p-toluenesulfonate, 1-(2-cyanoethyl)pyridinium ethyl sulfate, 1-(2-cyanoethyl)pyridinium thiocyanate, etc.

From the methyl-substituted pyridines, similarly there may be prepared quaternary derivatives of 3- and 4-picoline, such as 1-(2-cyanoethyl)-3-picolinium chloride, 1-(2-cyanoethyl)-3-picolinium p-toluenesulfonate, 1-(2-cyanoethyl)-3-picolinium ethyl sulfate, 1-(2-cyanoethyl)-3-picolinium thiocyanate, 1-(2-cyanoethyl)-4-picolinium chloride, 1-(2-cyanoethyl)-4-picolinium thiocyanate, etc. The class of methyl-substituted pyridines in which the N atom is free of steric hindrance also affords lutidine and collidine derivatives such as 1-(2-cyanoethyl)-3,4-dimethylpyridinium chloride, 1-(2-cyanoethyl)-3,5-dimethylpyridinium chloride, 1-(2-cyanoethyl)-3,4-dimethylpyridinium thiocyanate, 1-(2-cyanoethyl)-3,4,5-trimethylpyridinium chloride, etc. Pyridines containing longer chain alkyl substituents, on quaternization with the present beta-substituted propionitriles may give, e. g., 1-(2-cyanoethyl)-4-isopropylpyridinium chloride, 1-(2-cyanoethyl)-4-isohexylpyridinium bromide, 1-(2-cyanoethyl)-4-heptylpyridinium thiocyanate, etc.

The quaternary salts prepared by the process of this invention also include those derived from the tertiary amine N-heterocyclic polycyclic ring systems. For example, from isoquinoline there may be prepared in accordance with the invention 2-(2-cyanoethyl)isoquinolinium chloride, 2-(2-cyanoethyl)isoquinolinium bromide, 2-(2-cyanoethyl)isoquinolinium p-toluenesulfonate, 2-(2-cyanoethyl)isoquinolinium thiocyanate, 2-(2-cyanoethyl)isoquinolinium ethyl sulfate, etc. The quaternization of alkylisoquinolines with the present beta-substituted propionitriles affords, e. g., 2-(2-cyanoethyl)-4-methylisoquinolinium chloride, 2-(2-cyanoethyl)-6-ethylisoquinolinium p-toluenesulfonate, 2-(2-cyanoethyl)-4-isoamylisoquinolinium thiocyanate, etc. Reaction of benz[g]isoquinoline, a tricyclic tertiary amine, with a beta-substituted propionitrile by the process of the invention makes available, e. g., 2-(2-cyanoethyl)benz[g]isoquinolinium chloride. Using N-heterocyclic aromatically unsaturated tertiary amines wherein a plurality of nitrogen atoms are present in the ring skeletons, there may be obtained in accordance with the invention, for example, N-(2-cyanoethyl)pyrazinium chloride, N-(2-cyanoethyl)pyrimidinium chloride, N-(2-cyanoethyl)quinoxalinium chloride, etc.

In carrying out the present process, the N-heterocyclic tertiary amine is simply contacted with the beta-substituted propionitrile until reaction is complete. In carrying out this reaction, the propionitrile and the tertiary amine are preferably contacted in approximately equimolecular proportions, although an excess of the more readily available component may be used if desired. Preferably, the reaction mixture is heated to accelerate the formation of the quaternary salt; temperatures up to below the decomposition temperatures of the reaction components are suitable, and conveniently the reflux temperature of the reaction mixture may be used. It is sometimes convenient to carry out the reaction in the presence of inert solvents and diluents; suitable solvents are, for example, hydrocarbons such as benzene and hexane, and oxy compounds such as methanol, ethanol, or dioxane, etc. The time required to complete the reaction varies widely with the reaction temperature and reactivity of the reaction components, e. g., and may be extended as necessary to obtain satisfactory yields. The quaternary salt may be isolated by cooling the reaction mixture and collecting the product which separates; distilling the reaction mixture to remove solvent and unreacted starting materials; or adding to the reaction mixture a liquid, such as ether, which is a non-solvent for the quaternary, and which causes the separation thereof.

The quaternary salts prepared in the manner described above can be converted by the usual methods to corresponding quaternary ammonium hydroxide salts, for example, by reaction of the chloride salts with barium hydroxide, or by treatment of the salts with an anion exchanger. Other anions, similarly, may be substituted for the original propionate beta substituent by means known to those skilled in the art.

The products obtainable in accordance with this invention are generally stable compounds which range from viscous liquids and gels to waxy solids. They are mostly soluble in water and in ethanol. The present novel compounds are useful for a variety of agricultural and chemical purposes. For example, the quaternary salts of the invention can be applied from solution to cloth, which may thereafter be heated to remove the anion acid (e. g., HCl, HSCN), thereby imparting water-repellent and antistatic properties to the cloth. The thiocyanate salts may be used as pickling inhibitors. The present compounds also have surface-active properties, and may be used, e. g., as emulsifying agents, detergents, etc. The quaternary salts of this invention may also be used as toxicants, e. g., as herbicides, insecticides, nematocides, fungicides, etc. Thus, for example, the iodides may be used to defoliate crop plants. The present pyridinium thiocyanates may be used as bacteriostats and bactericides; 1-(2-cyanoethyl)-pyridinium thiocyanate causes cessation of the growth of *Micrococcus pyogenes* var. *aureus* on agar plates at a concentration of 0.1%.

The invention is illustrated, but not limited, by the following examples:

*Example 1*

This example describes the preparation of 3-thiocyanopropionitrile.

To 152.2 g. (2.0 moles) of ammonium thiocyanate in 615 ml. of ethanol were added 159 g. (2.0 moles) of β-chloropropionitrile. The mixture was refluxed for 5 hours, after which it was cooled and the solid which had precipitated was filtered off. The filtrate was evaporated to reduce the volume by removal of ethanol and then cooled and again filtered. The filtrate was washed twice with 100 ml. portions of water and then dried over sodium sulfate. After removal of solvent, there were obtained 93 g. of liquid, containing traces of an immiscible aqueous phase. The organic layer was removed and distilled, and after recovery of about 25 g. of β-chloropropionitrile, there were obtained 40.4 g. of 3-thiocyanopropionitrile, boiling at about 160° C./18mm., $n_D^{25}$ 1.5024. The identification of this material was confirmed by the following analysis:

|  | Found | Calcd. for $C_4H_4N_2S$ |
| --- | --- | --- |
| Percent C | 42.99 | 42.8 |
| Percent H | 3.67 | 3.6 |
| Percent N | 24.60 | 25.0 |
| Percent S | 27.55 | 28.5 |

*Example 2*

This example illustrates the preparation of a quaternary thiocyanate salt from the beta-substituted propionitrile.

A mixture of 32 g. (0.285 mole) of 3-thiocyanopropionitrile, 40 g. (0.38 mole) of pyridine, and 250 ml. of ethanol was refluxed for 60 hours. Material boiling up to 120° C./0.8 mm. was removed by distillation and the remaining liquid was washed with ether. After the ether had been stripped off from the immiscible washed liquid, there remained 31 g. of 1-(2-cyanoethyl)pyridinium thiocyanate, as a dark, viscous, water-soluble oil, $n_D^{25}$ 1.5024, the elemental analysis of which corresponded well to that calculated for $C_9H_9N_3S$.

*Example 3*

This example illustrates the preparation of a cyanoethyl pyridinium chloride wherein the tertiary amine is a monocyclic tertiary heterocyclic nitrogen compound.

A mixture consisting of 89.5 g. (1.0 mole) of 3-chloropropionitrile, 79 g. (1.0 mole) of pyridine, and 250 ml. of absolute ethanol was refluxed for 92 hours. At the end of this time, the ethanol was distilled off under vacuum, and the remaining reaction mixture was heated at 60–65° C. for an additional 2 hours under 0.3 mm. vacuum, whereupon the flask contents became solid, showing evidence of crystallinity in localized areas. After washing with acetone-ether, the waxy hygroscopic product was dried. A sample of the water-soluble solid recrystallized from an ethanol-ether mixture gave thin white plates melting at 145–148° C., the analysis of which corresponded closely to that theoretically calculated for 1-(2-cyanoethyl)pyridinium chloride.

*Example 4*

This example illustrates the preparation of a quaternary chloride wherein a bicyclic tertiary amine is quaternized.

A mixture of 103 g. (0.8 mole) of isoquinoline, 200 ml. of ethanol and 89.5 g. (1.0 mole) of 3-chloropropionitrile was refluxed for 87 hours. After removal of the ethanol, the solid residue was washed with ether and dried. The product was a light pink water-soluble solid, m. 198–200° C.; it weighed 151 g. (86.5% yield). After recrystallization from an ethanol-ether mixture, a sample of the 2-(2-cyanoethyl)isoquinolinium chloride thus prepared melted at 220–222° C. and analyzed as follows:

|  | Found | Calcd. for $C_{12}H_{11}ClN_2$ |
| --- | --- | --- |
| Percent C | 65.31 | 65.9 |
| Percent H | 5.31 | 5.07 |
| Percent Cl | 16.12 | 16.2 |
| Percent N | 11.67 | 12.8 |

*Example 5*

This example illustrates the preparation of an alkyl-substituted quaternary chloride.

A mixture of 93 g. (1.0 mole) of 3-picoline, 89.5 g. (1.0 mole) of 3-chloropropionitrile and 200 ml. of absolute ethanol was refluxed for 72 hours. Removal of the ethanol gave a clear viscous yellow oil which solidified on washing with ether. After drying, there was obtained a sticky, hygroscopic solid weighing 160 g. and melting at about 70° C. This represented, as shown by analysis, 1-(2-cyanoethyl)-3-picolinium chloride.

*Example 6*

Similarly, by the reaction of 93 g. of 4-picoline with 89.5 g. of 3-chloropropionitrile there was obtained 1-(2-cyanoethyl)-4-picolinium chloride, as a white hygroscopic powdery solid weighing 165 g. (90.5% yield). A sample recrystallized from ether-ethanol melted at 161–163° and analyzed as follows:

|  | Found | Calcd. for $C_9H_{11}ClN_2$ |
| --- | --- | --- |
| Percent C | 58.63 | 59.3 |
| Percent H | 6.25 | 6.07 |
| Percent N | 14.79 | 15.35 |
| Percent Cl | 19.21 | 19.45 |

While the invention has been described with particular reference to specific embodiments thereof, it will be recognized that other variations and modifications are within the capabilities of those skilled in the art.

What is claimed is:

1. A quaternary ammonium salt of the formula

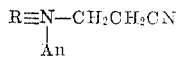

wherein An is the anion of a strong acid, and R≡N is a radical selected from the class consisting of pyridinium, 3-picolinium, 4-picolinium, 3,4-lutidinium, 3,5-lutidinium, 3,4,5-trimethylpyridinium, 4 - ethylpyridinium, 3-isopropylpyridinium, 3,4,5-triisopropylpyridinium, 4 - n - hexylpyridinium, isoquinolinium, 4-methylisoquinolinium and 6-propylisoquinolinium.

2. 1-(2-cyanoethyl)pyridinium chloride.
3. 1-(2-cyanoethyl)pyridinium thiocyanate.
4. 1-(2-cyanoethyl)-3-picolinium chloride.
5. 1-(2-cyanoethyl)-4-picolinium chloride.
6. 2-(2-cyanoethyl)isoquinolinium chloride.
7. A method which comprises contacting an amine from the class consisting of pyridine, 3-picoline, 4-picoline, 3,4-lutidine, 3,5-lutidine, 3,4,5-trimethylpyridine, 4-ethylpyridine, 3-isopropylpyridine, 3,4,5-triisopropylpyridine, 4-n-hexylpyridine, isoquinoline, 4-methylisoquinoline and 6-propylisoquinoline, with a beta-substituted propionitrile of the formula AnCH₂CH₂CN where An is an anion of a strong acid, and isolating from the resulting reaction product a quaternary salt of the formula

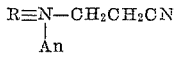

and R≡N is a radical selected from the class consisting of pyridinium, 3-picolinium, 4-picolinium, 3,4-lutidinium, 3,5-lutidinium, 3,4,5-trimethylpyridinium, 4-ethylpyridinium, 3 - isopropylpyridinium, 3,4,5 - triisopropylpyridinium, 4-n-hexylpyridinium, isoquinolinium, 4-methylisoquinolinium and 6-propylisoquinolinium.

8. The method which comprises contacting pyridine with 3-chloropropionitrile and isolating from the resulting reaction product 1-(2-cyanoethyl)pyridinium chloride.

9. The method which comprises contacting pyridine with 3-thiocyanopropionitrile and isolating from the resulting reaction product 1-(2-cyanoethyl)pyridinium thiocyanate.

10. The method which comprises contacting 3-picoline with 3-chloropropionitrile and isolating from the resulting reaction product 1-(2-cyanoethyl)-3-picolinium chloride.

11. The method which comprises contacting 4-picoline with 3-chloropropionitrile and isolating from the resulting reaction product 1-(2-cyanoethyl)-4-picolinium chloride.

12. The method which comprises contacting isoquinoline with 3-chloropropionitrile and isolating from the resulting reaction product 2-(2-cyanoethyl)isoquinolinium chloride.

References Cited in the file of this patent

Goldsmith et al.: Jour. Organ. Chem., vol. 18, pages 507–15 (1953).